Patented Feb. 26, 1929.

1,703,414

UNITED STATES PATENT OFFICE.

GORDON E. WIGHTMAN, OF UPPER MONTCLAIR, NEW JERSEY, ASSIGNOR TO BAKELITE CORPORATION, OF NEW YORK, N. Y., A CORPORATION OF DELAWARE.

PROCESS OF MAKING RESIN-IMPREGNATED SHEETS.

No Drawing. Application filed June 22, 1926. Serial No. 117,856.

This invention relates to improvements in processes of preparing fibrous sheets impregnated with a reactive phenolic resin, such as are described, for example, in United States Patent No. 1,551,428 granted August 25, 1925, to Redman and Cheetham. According to the process as described in the said patent, a fibrous material such as wood fiber, asbestos or the like is intimately commingled in the presence of water with a reactive phenolic resin, or with ingredients yielding such reactive resin, and thereafter laid into paper and dried, while retaining the reactive character of the resin and also, so far as possible, its plasticity. As explained in the said patent, loss of plasticity may result from the solution, by the water, of the free or loosely combined phenol or cresol which is a normal component of the resin composition. In order to avoid loss of plasticity through loss of phenol or cresol, the water used in the fabrication of the sheets is preferably maintained substantially saturated with respect to phenol.

In the practice of the said process it has been found that a further loss of phenol or cresol occurs during the drying operation when this is carried out on continuous dryers of the usual type. In such cases sufficient heat must of course be applied to the sheet to expel practically all of the moisture during the interval while the sheet is traversing the steam-heated roll system of the dryer; and application of heat at this rate and under these conditions not only expels a portion of the phenol or cresol content upon which the plasticity of the resin depends, but it also partially reacts the resin, thereby still further reducing its plasticity. It may moreover fuse the resin, at least locally, causing irregular and highly objectionable blotches and defects in the product.

I have discovered that all of the above disadvantages may be overcome, and that certain unlooked for advantages mentioned below may be gained, by carrying out the drying operation in continuous movement but at greatly reduced atmospheric pressure, preferably corresponding to about 28 inches of vacuum. Under these conditions I have found that as much as 98% of the moisture content of the paper may be driven off without such loss of phenol or cresol as will reduce the plasticity of the resin to a serious extent. Moreover the temperature of the sheet during this period, owing to the rapidity of the evaporation, need not exceed 100° F.; from which it follows not only that there is no fusion of the resins of the type ordinarily used (melting point about 225—230° F.) but resins of a fusing point of 190° F. or even lower may be safely used, which is a decided advantage on account of the very high plasticity of such low-melting resins. Furthermore, at these low temperatures, there is substantially no loss of plasticity due to the partial reaction of the resin.

Accordingly my invention comprises broadly drying the moving resin-impregnated sheets under such reduced pressure as will permit substantial elimination of water without materially or objectionably reducing the plasticity of the resin, whether by partial reaction or by loss of phenol or cresol by vaporization.

Among the marked advantages flowing from this mode of operation is the fact that scrap, waste, or clippings from the dried sheet may be worked back through the beater and thence again into paper which is in all respects equal in grade to the original sheet: whereas paper once dried on the usual type of open air dryer can never be re-worked into a sheet having qualities equal to those possessed by the original sheet.

A further and most important advantage is the fact, already mentioned, that whereas the application of sufficient heat at atmospheric pressure to eliminate the water results in material loss of phenol, the same operation can be carried out at sufficiently reduced pressure without incurring such losses, at least to the same extent. This fact, coupled with the use of temperatures below the point at which the transformation of the resin proceeds at an appreciable rate, permits the drying operation to be carried out without loss of the necessary plasticity of the resin.

Also, owing to this conservation of the phenol content of the resin, it becomes possible to operate with decidedly lower concentrations of phenol in the circulating water than would otherwise be required.

Furthermore, the use of reduced pressures is found to overcome the tendency often noted at atmospheric pressures for the paper to stick to the rolls, resulting in more or less localized defective areas or even perforations: this result is attributed to the lowering of the temperature of the sheet by the rapid evaporation of the moisture at the reduced pressure, whereby the resin is safeguarded from any possibility of fusion.

An additional and unexpected advantage of the use of reduced pressures is a greatly lessened tendency to clogging of the dryer felt, which is found to remain much more open and permeable to the escaping steam, whereby the rapidity of the drying operation is increased and the control of the temperatures is greatly facilitated.

The present process is most advantageously applied to water-laid sheets as described above, since the heating under reduced pressure permits the elimination of most of the water without serious loss of phenol as has already been described. However certain of the advantages of the invention are obtained by the application of heat under reduced pressure to fibrous sheets which have been impregnated or coated with an alcoholic or other solution of the reactive resin; thus a considerable saving of heat is effected; the solvent may be more quickly and completely eliminated with somewhat lessened tendency to react the resin; and the closed system lends itself readily to the recovery of the solvent. But the advantages in this case are less marked, because owing to the low boiling point of alcohol as compared with water, and owing also to the retarding effect of alcohol upon the hardening of the resin, it is quite possible to drive off most of the alcohol under atmospheric pressure without serious loss of plasticity. In this connection it is to be explained that alcohol and similar organic solvents have the effect of lowering the reactivity of the phenolic resins, whereas water does not have this effect at least to the same extent: whence it follows that the tendency of the resin to lose plasticity during the drying-out process is decidedly greater in the case of the water-laid sheets, due both to the greater reactivity of the resin and to the heavier losses of phenol.

The term "reactive resin" is used herein to include all such resins and resin-compositions, especially those of the phenol-aldehyde or phenol-methylene type, as are capable of transformation by sufficient application of heat into infusible resinoid products. Such reactive resins may comprise either partial reaction products of phenol and formaldehyde, or their equivalents, which are directly transformable as above; or a mixture of a non-reactive phenolic resin with a suitable proportion of a methylene-containing hardening agent such as hexamethylene-tetramin or paraform or the like, or with a body of aldehyde character capable of a similar hardening effect.

I claim:

1. The hereindescribed process of preparing a substantially dry fibrous sheet impregnated with a reactive and plastic resin, which consists in suspending in water a fiber and a reactive resin; laying the mixture into a sheet and draining excess water therefrom; and finally moving the partially dried sheet through a zone of reduced pressure while heating the same sufficiently to expel the bulk of the residual moisture without substantially reacting the resin or lessening its plasticity.

2. In a process of preparing a fibrous sheet impregnated with a reactive and plastic resin, the step which consists in moving the sheet through a zone of reduced pressure while heating the same sufficiently to expel moisture without substantially reacting the resin or lessening its plasticity.

3. In a process of preparing a fibrous sheet impregnated with a reactive and plastic resin, the step which consists in moving the sheet through a zone of reduced pressure while heating the same to a temperature below the melting point of the resin, thereby expelling moisture without substantially reacting the resin or lessening its plasticity.

In testimony whereof, I affix my signature.

GORDON E. WIGHTMAN.